US009635670B2

(12) United States Patent
Yu et al.

(10) Patent No.: US 9,635,670 B2
(45) Date of Patent: *Apr. 25, 2017

(54) METHOD AND APPARATUS FOR MULTIPLEXING FREQUENCY HOPPING IN A COMMUNICATION SYSTEM

(71) Applicant: Samsung Electronics Co., Ltd., Gyeonggi-do (KR)

(72) Inventors: Jae-Chon Yu, Gyeonggi-do (KR); Hwan-Joon Kwon, Gyeonggi-do (KR); Dong-Hee Kim, Gyeonggi-do (KR); Yeon-Ju Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 6 days.

This patent is subject to a terminal disclaimer.

(21) Appl. No.: 14/665,355

(22) Filed: Mar. 23, 2015

(65) Prior Publication Data
US 2015/0195839 A1 Jul. 9, 2015

Related U.S. Application Data

(63) Continuation of application No. 14/274,314, filed on May 9, 2014, now Pat. No. 8,989,233, which is a (Continued)

(30) Foreign Application Priority Data

Feb. 7, 2007 (KR) ........................ 10-2007-0012964

(51) Int. Cl.
H04B 1/713 (2011.01)
H04L 1/18 (2006.01)
(Continued)

(52) U.S. Cl.
CPC ........ *H04W 72/0453* (2013.01); *H04B 1/713* (2013.01); *H04B 1/7143* (2013.01);
(Continued)

(58) Field of Classification Search
CPC .... H04B 1/713; H04B 1/7136; H04B 1/7143; H04B 1/1861; H04B 2201/713;
(Continued)

(56) References Cited

U.S. PATENT DOCUMENTS 5,796,827 A 8/1998 Coppersmith et al.
5,914,701 A 6/1999 Gersheneld et al.
(Continued)

FOREIGN PATENT DOCUMENTS

KR 1020060013653 2/2006
KR 1020060020884 3/2006
(Continued)

*Primary Examiner* — Young T Tse
(74) *Attorney, Agent, or Firm* — The Farrell Law Firm, P.C.

(57) ABSTRACT

Methods and apparatuses are provided for transmitting data in a mobile station of a wireless communication system. Hopping information including a number of sub-bands and a size of a sub-band is identified. Resource allocation information is identified. A resource index is determined for transmitting the data based on the resource allocation information, and determining a resource index change in a unit of a sub-band, a resource index change in a unit of a resource unit, the number of sub-bands, and the size of the sub-band. The data is transmitted using the determined resource index. Each sub-band includes at least one resource unit, and each resource unit includes a plurality of subcarriers.

20 Claims, 9 Drawing Sheets

Related U.S. Application Data continuation of application No. 13/099,789, filed on May 3, 2011, now Pat. No. 8,761,229, which is a continuation of application No. 12/027,621, filed on Feb. 7, 2008, now Pat. No. 7,936,806.

(51) Int. Cl.

| | | |
|---|---|---|
| *H04L 5/00* | (2006.01) | |
| *H04W 72/04* | (2009.01) | |
| *H04B 1/7143* | (2011.01) | |

(52) U.S. Cl.
CPC ............ *H04L 1/1861* (2013.01); *H04L 5/006* (2013.01); *H04L 5/0007* (2013.01); *H04L 5/0041* (2013.01); *H04L 5/0094* (2013.01); *H04B 2201/713* (2013.01)

(58) Field of Classification Search
CPC .......... H04B 2201/7133; H04L 5/0007; H04L 5/0041; H04L 5/006; H04L 5/0094; H04L 27/2628; H04L 27/263; H04L 27/2634; H04L 27/265; H04L 27/2653; H04L 1/1861; H04W 72/0453
USPC ......... 375/132–136, 260; 370/208, 210, 319, 370/321, 322, 330, 337, 344, 347, 348
See application file for complete search history.

(56) References Cited

U.S. PATENT DOCUMENTS

| | | |
|---|---|---|
| 6,211,799 B1 | 4/2001 | Post et al. |
| 6,223,018 B1 | 4/2001 | Fukumoto et al. |
| 7,171,177 B2 | 1/2007 | Park et al. |
| 7,177,297 B2 | 2/2007 | Agrawal et al. |
| 7,668,122 B2 | 2/2010 | Sung et al. |
| 2005/0254555 A1 | 11/2005 | Teague |
| 2006/0039318 A1 | 2/2006 | Oh et al. |
| 2006/0045001 A1 | 3/2006 | Jalali |
| 2006/0045118 A1 | 3/2006 | Hyoung et al. |
| 2006/0133522 A1* | 6/2006 | Sutivong ................ H04B 1/692 375/260 |
| 2006/0135075 A1* | 6/2006 | Tee ........................ H04L 5/0007 455/67.13 |
| 2006/0136015 A1 | 6/2006 | Park et al. |
| 2006/0203707 A1 | 9/2006 | Lee et al. |
| 2006/0233124 A1* | 10/2006 | Palanki ................ H04B 1/7143 370/319 |
| 2006/0256887 A1 | 11/2006 | Kwon et al. |
| 2007/0041404 A1 | 2/2007 | Palanki et al. |
| 2007/0097942 A1* | 5/2007 | Gorokhov ............ H04B 7/2656 370/342 |
| 2007/0218915 A1 | 9/2007 | Yang et al. |
| 2007/0263702 A1 | 11/2007 | Kwon et al. |
| 2007/0263740 A1 | 11/2007 | Kwon et al. |
| 2009/0061778 A1 | 3/2009 | Vrzic et al. |
| 2009/0175220 A1 | 7/2009 | Yi et al. |
| 2009/0303938 A1* | 12/2009 | Kim ........................ H04L 5/023 370/329 |
| 2010/0329365 A1* | 12/2010 | Li ........................ H04L 5/0007 375/259 |

FOREIGN PATENT DOCUMENTS

| | | |
|---|---|---|
| KR | 1020060022739 | 3/2006 |
| KR | 1020060030926 | 4/2006 |
| KR | 1020060064472 | 6/2006 |
| KR | 1020070093657 | 9/2007 |
| KR | 1020070097862 | 10/2007 |
| WO | WO 2004/038972 | 5/2004 |

* cited by examiner

METHOD AND APPARATUS FOR MULTIPLEXING FREQUENCY HOPPING IN A COMMUNICATION SYSTEM

PRIORITY

This application is a Continuation Application of U.S. application Ser. No. 14/274,314, which was filed in the U.S. Patent and Trademark Office (USPTO) on May 9, 2014, which is Continuation Application of U.S. application Ser. No. 13/099,789, filed in the USPTO on May 3, 2011, now U.S. Pat. No. 8,761,229, issued on Jun. 24, 2014, now U.S. Pat. No. 8,989,233, which is a Continuation Application of U.S. application Ser. No. 12/027,621, filed in the USPTO on Feb. 7, 2008, now U.S. Pat. No. 7,936,806, which issued on May 3, 2011, which claims priority under 35 U.S.C. §119(a) to a Korean Patent Application filed in the Korean Intellectual Property Office on Feb. 7, 2007 and assigned Serial No. 2007-12964, the disclosures of which is incorporated herein by reference.

BACKGROUND OF THE INVENTION

1. Field of the Invention

The present invention relates generally to a method and apparatus for multiplexing frequency hopping in a communication system, and in particular, to a frequency hopping multiplexing method and apparatus for efficiently indicating time division multiplexing for wide-band frequency hopping and sub-band frequency hopping in a wireless communication system using Frequency Division Multiple Access.

2. Description of the Related Art

Recently, in mobile communication systems, extensive search is being conducted into Orthogonal Frequency Division Multiplexing (OFDM) as a scheme for high-speed data transmission in wire/wireless channels. OFDM, a scheme for transmitting data using multiple carriers, is one type of Multi-Carrier Modulation (MCM) scheme that converts a serial input symbol stream into parallel symbol streams and modulates each of the parallel symbol streams with a plurality of orthogonal sub-carriers, i.e., a plurality of orthogonal sub-carrier channels, before transmission.

A system that distinguishes several users using the multiple sub-carriers while adopting OFDM as its basic transmission scheme, in other words, a system that supports several users, with a scheme of allocating different sub-carriers to different users, is an Orthogonal Frequency Division Multiple Access (OFDMA) scheme.

FIG. 1 is a diagram illustrating an example where a terminal transmits data over arbitrary allocated resources in a general OFDMA system. FIG. 1 is composed of one or multiple sub-carriers in the frequency domain, and of one or multiple OFDM symbols in the time domain. In FIG. 1, reference numeral 101 indicates resources that a terminal 1 MS1 uses to transmit data, and reference numeral 103 indicates resources that a terminal 2 MS2 uses to transmit data. The term 'resource' as used herein refers to resources in the time-frequency domain, and indicates OFDMA symbols in the time domain and sub-carriers in the frequency domain.

Referring to FIG. 1, the resources 101 and 103 that the terminal 1 and the terminal 2 use to transmit data, consecutively occupy particular frequency bands with the passage of time. This resource allocation scheme or data transmission scheme is widely used for the case where there is an intention to select a frequency band having a good channel state and allocate the selected frequency band to each terminal, thereby maximizing the system performance with the limited system resources.

For example, in FIG. 1, for a wireless channel that the terminal 1 experiences, the parts indicated by reference numeral 101 are relatively superior to other frequency bands in the frequency domain, and for a wireless channel that the terminal 2 experiences, the parts indicated by reference numeral 103 are relatively superior to other frequency bands in the frequency domain. A scheme of selectively allocating resources by selecting frequency bands having a superior channel response in the frequency domain is generally referred to as 'frequency selective resource allocation' or 'frequency selective scheduling'.

Although the foregoing description has been given with reference to the uplink (or reverse link), i.e., data transmission from a terminal to a base station, for convenience, the same can be applied even to the downlink (or forward link), i.e., data transmission from a base station to a terminal. In the case of the downlink, in FIG. 1, the parts indicated by reference numerals 101 and 103 indicate resources that the base station uses to transmit data to the terminal 1 and resources that the base station uses to transmit data to the terminal 2, respectively.

The frequency selective scheduling illustrated in FIG. 1 is not always available. For example, for a terminal moving at a high speed, since its channel state varies quickly, the frequency selective scheduling is unavailable for the terminal for the following reasons. When a base station scheduler allocates resources to a particular terminal by selecting a frequency band having a superior channel state, the terminal receives resource allocation information from the base station and actually transmits data over the allocated resources. However, since the channel environment has already changed greatly at an actual data transmission time, the selected frequency band is not guaranteed to still have a superior channel state. There is a frequency hopping scheme as an available scheme for this case. It should be noted that the use of the frequency hopping is not limited only to the case where the frequency selective scheduling is unavailable.

FIG. 2 is a diagram illustrating an example where a frequency hopping scheme is used in a general OFDMA system. Referring to FIG. 2, it can be noted that resources that one terminal uses to transmit data continuously change (or hop) with the passage of time. This frequency hopping scheme contributes to randomizing the interference that data transmission suffers, and the channel quality.

In the general wireless communication system, a Hybrid Automatic Repeat reQuest (HARQ) technology is one of the major technologies used for increasing the reliability of data transmission and the data throughput. The term 'HARQ' refers to a combined technology of an Automatic Repeat reQuest (ARQ) technology and a Forward Error Correction (FEC) technology. In the ARQ technology widely used in the wire/wireless data communication system, a transmitter assigns sequence numbers to data packets according to a predefined scheme before transmission, and a receiver sends to the transmitter a retransmission request for a data packet(s) with a missing sequence number among the received data packets, thereby achieving reliable data transmission. The term 'FEC' refers to a technology for adding redundant bits to transmission data according to a predetermined rule before transmission, like convolutional coding and/or turbo coding, thereby coping with noise generated in a data transmission/reception process and/or errors occurring in the fading environment and the like, and thus demodulating the originally transmitted data.

In a system using HARQ proposed by combining the two technologies ARQ and FEC, a data receiver determines if there are any errors in the received data by performing a Cyclic Redundancy Check (CRC) check on the data decoded by way of a predetermined inverse FEC process. If there are no errors as a result of the CRC check, the receiver feeds back an Acknowledgement (ACK) to a transmitter so that the transmitter may transmit the next data packet, and if it is determined that there is an error in the received data, the receiver feeds back a Non-Acknowledgement (NACK) to the transmitter so that the transmitter may retransmit the previously transmitted packet. In the retransmission process, the receiver combines the retransmitted packet with the previously transmitted packet, thereby obtaining energy and coding gain. Therefore, with the use of HARQ, the communication system can obtain performance remarkably improved from that of the communication system using the conventional ARQ with no combining process.

The communication system employing HARQ basically employs the frequency hopping scheme in order to obtain a diversity effect in the forward and reverse transmissions. To obtain the diversity effect, the communication system uses a Distributed Resource Channel (DRCH) in the forward link and a wide-band frequency hopping scheme in the reverse link. To maximize the diversity effect in the reverse link, a multiplexing ratio of slots using the wide-band frequency hopping scheme to slots using a sub-band frequency hopping scheme is very important. However, in the current OFDMA system, no scheme has been proposed for efficiently multiplexing wide-band frequency hopping and sub-band frequency hopping so as to maximize the diversity effect, without additional overhead. Therefore, there is a need for a scheme for efficiently managing frequency hopping multiplexing in the forward and reverse links in a communication system.

SUMMARY OF THE INVENTION

An aspect of the present invention is to address at least the problems and/or disadvantages described above and to provide at least the advantages described below. Accordingly, an aspect of the present invention is to provide a method and apparatus for efficiently transmitting data in a communication system.

Another aspect of the present invention is to provide a method and apparatus for efficiently multiplexing data in a communication system.

Furthermore, another aspect of the present invention is to provide a method and apparatus for efficiently multiplexing frequency hopping in an Orthogonal Frequency Division Multiple Access (OFDMA) system.

According to one aspect of the present invention, a method is provided for transmitting data in a mobile station of a wireless communication system. Hopping information including a number of sub-bands and a size of a sub-band is identified. Resource allocation information is identified. A resource index is determined for transmitting the data based on the resource allocation information, and determining a resource index change in a unit of a sub-band, a resource index change in a unit of a resource unit, the number of sub-bands, and the size of the sub-band. The data is transmitted using the determined resource index. Each sub-band includes at least one resource unit, and each resource unit includes a plurality of subcarriers.

According to another aspect of the present invention, a method is provided for receiving data in a base station of a wireless communication system. Hopping information including a number of sub-bands and a size of a sub-band is transmitted. Resource allocation information is transmitted. A resource index used for receiving the data based on the resource allocation information, and determining a resource index change in a unit of a sub-band, a resource index change in a unit of a resource unit, the number of sub-bands, and the size of the sub-band, is determined. The data is received from a mobile station using the determined resource index. Each sub-band includes at least one resource unit, and each resource unit includes a plurality of subcarriers.

According to further another aspect of the present invention, an apparatus is provided for transmitting data in a wireless communication system. The apparatus includes a resource allocation information receiver configured to identify hopping information including a number of sub-bands and a size of a sub-band, and identify resource allocation information. The apparatus also includes a controller configured to determine a resource index for transmitting the data based on the resource allocation information, and to determine a resource index change in a unit of a sub-band, a resource index change in a unit of a resource unit, the number of sub-bands, and the size of the sub-band. The apparatus further includes a transmitter configured to transmit the data using the resource index. Each sub-band includes at least one resource unit, and each resource unit includes a plurality of subcarriers.

According to yet another aspect of the present invention, an apparatus is provided for receiving data in a wireless communication system. The apparatus includes a controller configured to transmit hopping information including a number of sub-bands and a size of a sub-band, transmit resource allocation information, determine a resource index used for receiving the data based on the resource allocation information, and determine a resource index change in a unit of a sub-band, a resource index change in a unit of a resource unit, the number of sub-bands, and the size of the sub-band. The apparatus also includes a receiver configured to receive the data from a mobile station using the resource index. Each sub-band includes at least one resource unit, and each resource unit includes a plurality of subcarriers.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE EMBODIMENTS OF THE PRESENT INVENTION

Embodiments of the present invention will now be described in detail with reference to the annexed drawings. In the following description, a detailed description of known functions and configurations incorporated herein has been omitted for clarity and conciseness.

Although the following description will be given with reference to an OFDMA system for convenience, it should be noted that the method and apparatus proposed by the present invention is not necessarily limited to the OFDMA system, but can also be applied to any Frequency Division Multiple Access (FDMA) system.

The present invention provides a management method and transmission/reception apparatus for multiplexing reverse wide-band and sub-band frequency hopping schemes in a wireless communication system using Frequency Division Multiple Access.

For a better understanding of the present invention, a description will first be made of a data transmission method in a general communication system to which HARQ is applied.

Figure 1:
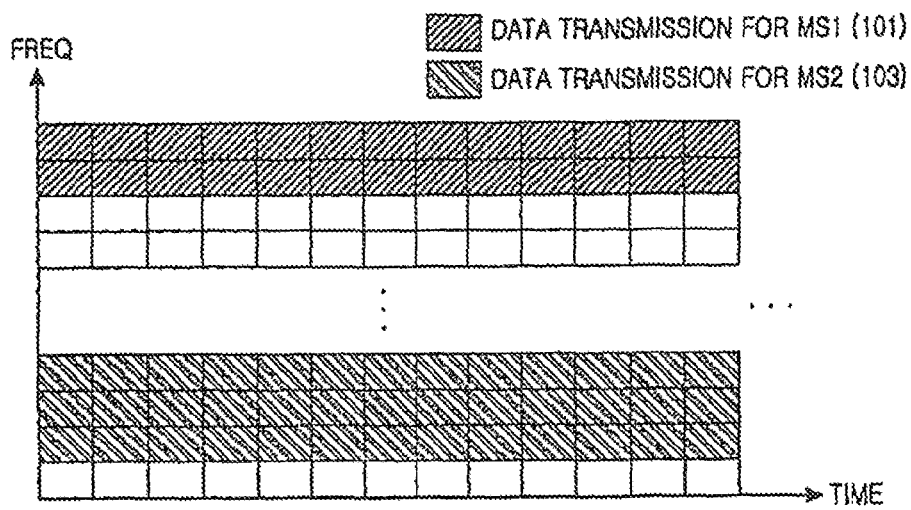
FIG. 1 is a diagram illustrating an example where a terminal transmits data over arbitrary allocated resources in a general OFDMA system.
Figure 2:
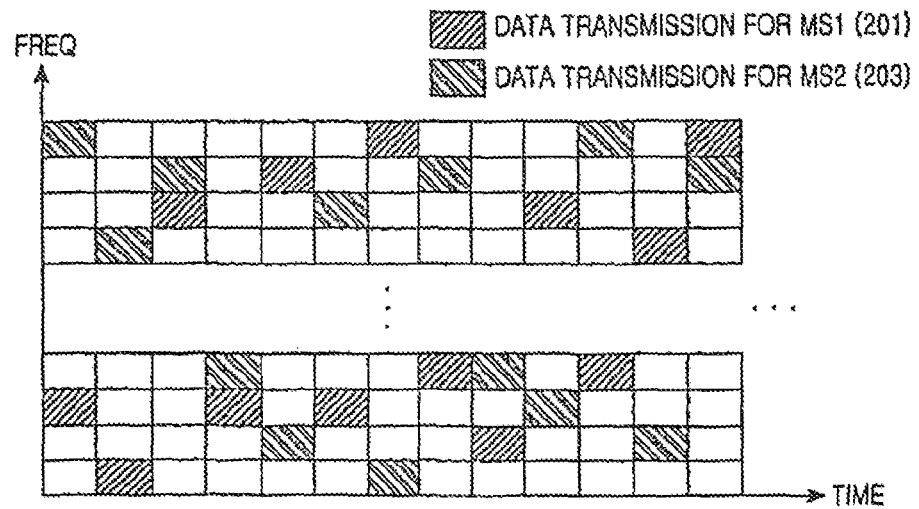
FIG. 2 is a diagram illustrating an example where a frequency hopping scheme is used in a general OFDMA system.
Figure 3:
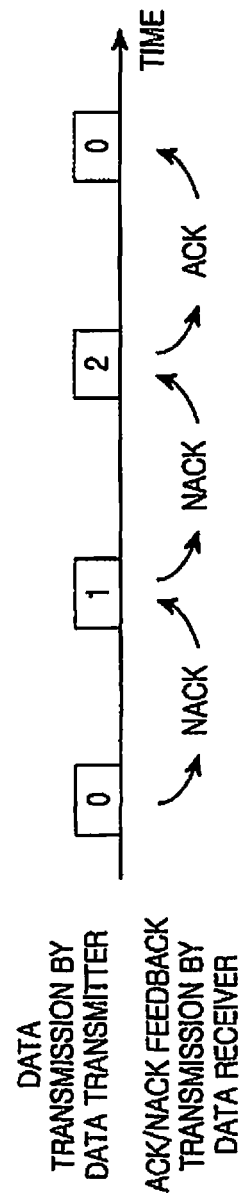
FIG. 3 is a diagram illustrating an example of data transmission to which general HARQ is applied.

FIG. 3 is a diagram illustrating an example of data transmission to which general HARQ is applied. In FIG. 3, the horizontal axis represents the time domain, and a rectangle represents one transmission sub-packet. As illustrated in FIG. 3, in the general HARQ system, several sub-packets are transmitted to successfully transmit one packet. Numeral shown in each rectangle represents an identifier for a transmission sub-packet.

For example, in FIG. 3, a sub-packet indicated by '0' is an initial transmission packet in a process of transmitting one packet. After the sub-packet marked with '0' is first transmitted, a receiver receives the sub-packet and then attempts demodulation thereon. When the data demodulation fails, i.e., when it is determined that there is an error in the data transmission, the receiver feeds back a NACK. Upon receiving the NACK, a transmitter transmits the next sub-packet, i.e., sub-packet indicated by a sub-packet identifier '1'. Upon receiving the sub-packet #1, the receiver combines the sub-packet #0 with the sub-packet #1, and then re-attempts demodulation thereon. When the data demodulation fails even in this demodulation process, i.e., when it is determined that there is an error in the data transmission, the receiver feeds back again a NACK. The retransmission process is repeated until the transmission packet is successfully demodulated at the receiver, or repeated until the number of retransmissions reaches the predetermined maximum number of retransmissions.

For a better description of frequency selective resource management, a mixed management method of frequency hopping and HARQ schemes, and a transmission/reception apparatus according to the present invention, definitions of terms will be given as follows.

Sub-band: a unit of a frequency band where frequency selective resource allocation or frequency selective scheduling is performed. That is, it is assumed that when frequency selective resource allocation is available, a resource allocation entity (or scheduler) can determine relative superiority in channel quality in units of the sub-bands in the frequency domain. For example, it is assumed that when the entire system band is 10 MHz and the sub-band 625 KHz, the resource allocation entity can determine which of 16 sub-bands existing in the 10-MHz band is superior.

Wide-band: the entire system band, or a band where an independent resource allocation scheme is managed. For example, when the entire system band is 10 MHz, the wide-band is 10 MHz for the case where resource allocation is performed on the 10 MHz, but the wide-band is 5 MHz for the case where the 10 MHz is divided into two 5-MHz bands and resource allocation is performed on the two 5-MHz bands independently.

Sub-channel: a basic unit where resources are allocated to a particular terminal. The sub-channel is composed of one or multiple sub-carriers in the frequency domain, and one or multiple OFDM symbols in the time domain. Actual physical mapping of the sub-channel is subject to change as time goes by. That is, it should be noted that actual physical mapping of the sub-channel may undergo hopping with the passage of time. In addition, it should be noted that the present invention is not limited to a method of configuring a particular sub-channel.

Slot: a time-domain unit where one sub-packet is transmitted. One slot is defined over an OFDM symbol corresponding to one or multiple sub-channels.

Distributed Resource CHannel (DRCH): represents a channel which is distributed over the frequency at regular intervals to obtain the maximum diversity in the frequency domain.

Block Resource CHannel (BRCH): represents a channel that occupies all sub-carriers of a small band in the frequency domain to make the best use of sub-band scheduling.

Based on the terms defined above, a summary will be made below of characteristics of frequency selective resource management, and a mixed management method of frequency hopping and HARQ scheme according to the present invention.

First, an agreement on a value of the sub-band is made in a transmission/reception interval. For the agreement, a scheme is used in which a base station provides information on the value of the sub-band to all terminals in its system. For example, when it is agreed that the entire system band is 10 MHz and the sub-band is 625 KHz, there are 16 sub-bands in the entire system band.

Second, slots are divided into slots used only for wide-band frequency hopping HARQ (referred to as 'global hopping'), and slots used only for sub-band frequency hopping HARQ (referred to as 'local hopping').

Third, a base station allocates the partial or full band of the slot used only for global hopping to each terminal, or allocates the partial or full band of the slot used only for local hopping to each terminal. Alternatively, both the partial or full band of the slot used only for global hopping and the partial or full band of the slot used only for local hopping can be allocated to one terminal.

Fourth, a terminal, which is allocated the partial or full band of the slot used only for global hopping, restrictively (exclusively) transmits data while performing an HARQ operation over the wide-band in the slot used only for global hopping and restrictively performing frequency hopping in the allocated band. However, a terminal, which is allocated the partial or full band of the slot used only for local hopping, restrictively performs an HARQ operation in the slot used only for local hopping, and restrictively performs frequency hopping in the sub-band corresponding to the allocated band.

Figure 4:
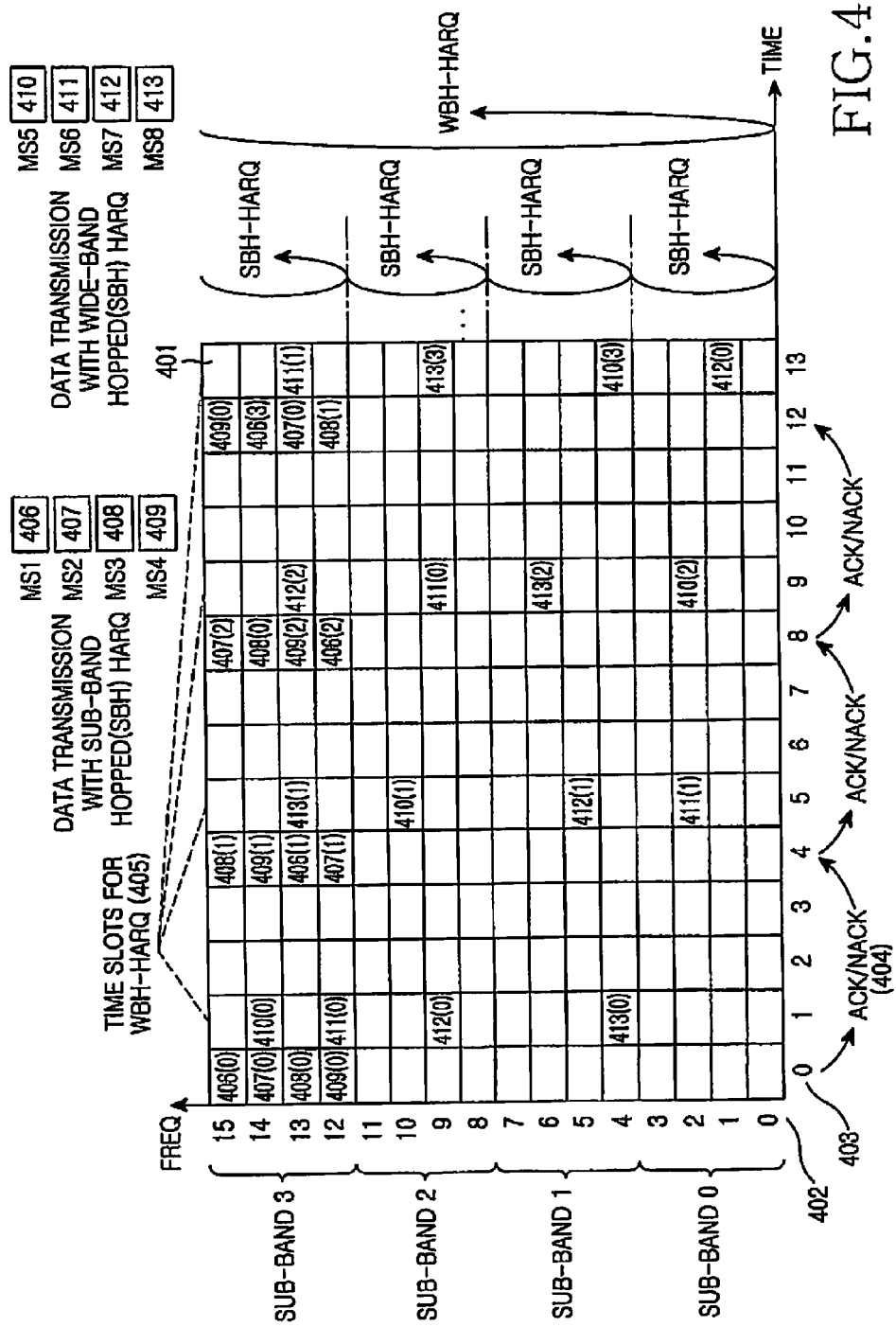
FIG. 4 is a diagram illustrating a method for performing time division multiplexing on sub-band and wide-band frequency hopping schemes according to a preferred embodiment of the present invention.

FIG. 4 is a diagram illustrating a method for performing time division multiplexing on sub-band and wide-band frequency hopping schemes according to a preferred embodiment of the present invention. Shown in FIG. 4 are sub-band frequency hopping and wide-band frequency hopping schemes based on the slots allocated for local hopping and the slots allocated for global hopping.

Referring to FIG. 4, the horizontal axis represents the time domain, and the vertical axis represents the frequency domain. A small rectangle indicated by reference numeral 401 represents one sub-channel. Frequency-domain numerals indicated by reference numeral 402 are numerals representing indexing for sub-channels in the frequency domain, and time-domain numerals indicated by reference numeral 403 are numerals representing indexing for slots in the time domain.

In an example shown in FIG. 4, one sub-band is composed of four sub-channels. That is, sub-channels 0~3 constitute a sub-band 0; sub-channels 4~7 constitute a sub-band 1; sub-channels 8~11 constitute a sub-band 2; and sub-channels 12~15 constitute a sub-band 3. As shown, the full band is composed of 4 sub-bands, and each sub-band is a unit where frequency selective resource allocation is performed. Among the slots shown in FIG. 4, slot indexes 1, 5, 9, 13, . . . (405) are slots where the global hopping scheme is used.

With reference to FIG. 4, a description will be made of a scheme in which a base station allocates resources to a terminal. In a slot 0, the base station allocates sub-channels to terminals 1 (MS1, 406) through 4 (MS4, 409). The terminals 1 (406) through 4 (409) are allocated the slots used only for local hopping. Therefore, in the slot 0, the base station allocates a sub-channel 15 to the terminal 1 (MS1, 406), allocates a sub-channel 14 to the terminal 2 (MS2, 407), allocates a sub-channel 13 to the terminal 3 (MS3, 408), and allocates a sub-channel 12 to the terminal 4 (MS4, 409). The base station allocates, to the four terminals, some sub-channels of the slot where the local hopping scheme is used. The four terminals transmit data while performing the frequency hopping and HARQ schemes in the sub-band including their allocated sub-channels (all included in the sub-band 3 in this example), over the slots where the local hopping scheme is used.

In a slot 1, the base station allocates sub-channels to terminals 5 (MS5, 410) through 8 (MS8, 413). The terminals 5 (410) through 8 (413) are allocated the slots used only for global hopping. Therefore, as shown in FIG. 4, in the slot 1, the base station allocates a sub-channel 14 to the terminal 5 (MS5, 410), allocates a sub-channel 12 to the terminal 6 (MS6, 411), allocates a sub-channel 9 to the terminal 7 (MS7, 412), and allocates a sub-channel 4 to the terminal 8 (MS8, 413). The base station allocates, to the four terminals, some sub-channels of the slot where the global hopping scheme is used. The four terminals transmit data while performing the wide-band frequency hopping and HARQ schemes over the slots where the global hopping scheme is used. Reference numeral 404 represents a response signal that a receiving side (base station herein) feeds back to a transmitting side (terminal herein) upon receipt of a data packet, and depending on the response signal, the transmitting side transmits the next data packet, or retransmits the previously transmitted data packet. Regarding a slot with an index 8, it can be appreciated that the first data packet, which was transmitted in the slot with an index 0 over the sub-channel 14 allocated to the terminal 3 (408), are retransmitted.

As illustrated in FIG. 4, regarding the frequency hopping and HARQ schemes according to the present invention, the terminal, which is allocated the partial or full band of the slot used only for local hopping, restrictively performs an HARQ operation in the slot used only for local hopping, and restrictively performs frequency hopping using the allocated sub-channel in the sub-band corresponding to the allocated band. In addition, the terminal, which is allocated the partial or full band of the slot used only for global hopping, restrictively transmits data while performing an HARQ operation over the wide-band in the slot used only for global hopping, and restrictively performs frequency hopping using the allocated sub-channel in the allocated band.

Figure 5:
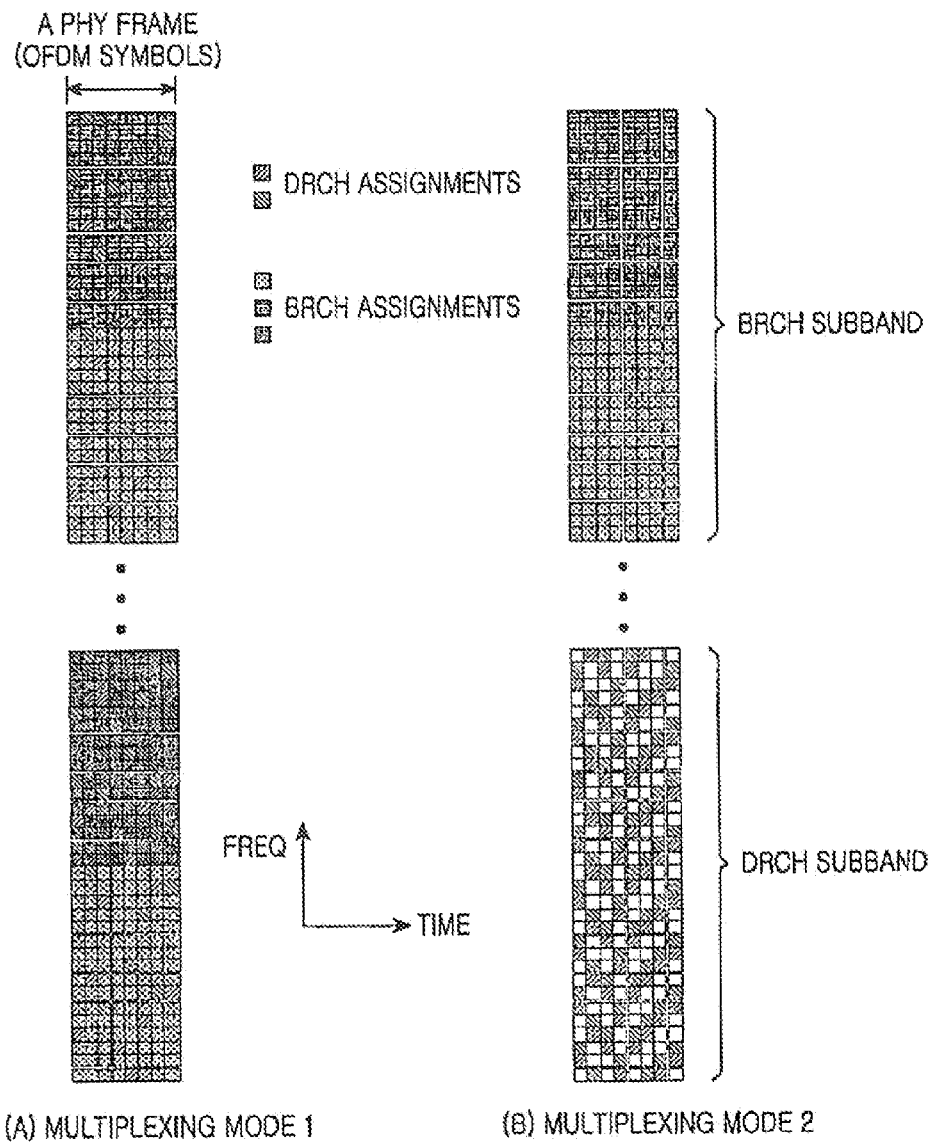
FIG. 5 is diagrams illustrating a multiplexing scheme for DRCH and BRCH in the forward link to which the present invention is applied.

FIG. 5 are diagrams illustrating a multiplexing scheme for DRCH and BRCH in the forward link to which the present invention is applied, wherein there are two multiplexing modes.

Diagram A of FIG. 5 illustrates a first multiplexing mode where DRCH and BRCH are multiplexed. In the case of the DRCH, sub-carrier resources are allocated over the full band so as to obtain the maximum frequency diversity. The sub-carriers used by the DRCH can not be used by the BRCH, and the resources remaining after resources are used by the DRCH are used by the BRCH separately for each sub-band.

Diagram B of FIG. 5 illustrates a second multiplexing mode where DRCH and BRCH are allocated in different sub-bands. In the case of the BRCH, the allocated sub-band is used by the same channels altogether. In the case of the DRCH, sub-carrier resources are maximally distributed within a given sub-band so as to obtain the maximum frequency diversity.

According to the preferred embodiment of the present invention, a base station provides to a terminal information related to the number of DRCHs, using a Forward link Secondary Broadcast Control CHannel (F-SBCCH), which is one of the forward common channels, and the terminal multiplexes global hopping and local hopping using the information related to the number of DRCHs, received from the base station.

The information related to the number of DRCHs, provided to the terminal by the base station, includes the number of DRCHs allocated in one sub-band (referred to as a 'subzone') and the number of subzones to which the DRCH is allocated. The terminal calculates the number of DRCHs from the information related to the number of DRCHs, received from the base station. Further, the terminal performs time division multiplexing on global hopping and local hopping using the calculated number of DRCHs.

A detailed description will now be made of an example of a reverse frequency hopping multiplexing method and apparatus for efficiently performing the multiplexing method based on the present invention.

The number of tones using a DRCH channel is provided to the terminal by the base station using Equation (1).

$$N_{DRCH} = \text{NumDRCHSubzones} \times N_{SUBZONE,MAX} \quad (1)$$

In Equation (1), $N_{SUBZONE,MAX}$ denotes the number of tones existing in one subzone, and NumDRCHSubzones denotes the number of subzones having a DRCH. The NumDRCHSubzones information is delivered from the base station to the terminal over the F-SBCCH, and the $N_{SUBZONE,MAX}$ value is delivered over the F-SBCCH in the form of FLSubzoneSize.

In an example of calculating the number of DRCHs using Equation (1), the number $N_{SUBZONE,MAX}$ of DRCH tones per subzone for multiplexing is assumed to be 64 in the forward link. This is a value corresponds to 4 DRCHs because one DRCH has 16 tones in one OFDM symbol.

When the entire frequency band is 5 MHz, because the communication system having a 5-MHz frequency band can allocate 32 resources, 8 NumDRCHSubzones can be expressed by dividing the total number of resources by the number 4 of DRCHs allocated in one subzone for multiplexing. That is, the system can indicate the number of DRCHs allocated for multiplexing in the forward link by using 0, 1, 2, 3, 4, 5, 6 and 7. The NumDRCHSubzones is referred to in as a 'multiplexing indicator'. That is, the expression 'a multiplexing indicator for multiplexing in the forward link is 3' means that the number of DRCHs allocated for multiplexing in the forward link is 12.

The multiplexing indicator is used even for frequency hopping multiplexing in the reverse link. It is assumed herein that the percentage of the DRCH used in the forward link is equal to the percentage of global hopping in the time domain in the reverse link. The reason why the percentage of the DRCH in the forward link is assumed to be equal to the percentage of wide-band frequency hopping scheme in the reverse link is because the DRCH in the forward link and global hopping in the reverse link are the same scheme of maximizing frequency diversity. Therefore, it is natural that the terminal, which uses the DRCH for maximizing frequency diversity in the forward link, follows the global hopping scheme for maximizing frequency diversity even in the reverse link. For example, a high-velocity terminal or a terminal using Voice over Internet Protocol (VoIP) can use the DRCH in the forward link and the global hopping scheme in the reverse link to maximize frequency diversity.

A detailed description will now be made of a method of using the multiplexing indicator for the reverse global hopping scheme. The multiplexing indicator indicates how many DRCHs exist in the forward link, and is also used for calculating the number of slots used for the global hopping scheme in the reverse link. Equation (2) is a modification of Equation (1), used for calculating a multiplexing indicator M.

$$M = \text{NumDRCHSubzones} = N_{DRCH}/N_{SUBZONE,MAX} \quad (2)$$

When $N_{SUBZONE,MAX} = 64$ and $N_{DRCH,TONE} = 16$ from the foregoing example, Equation (2) can be rewritten as Equation (3).

$$M = (N_{DRCH}/N_{DRCH,TONE})/(N_{SUBZONE,MAX}/N_{DRCH,TONE}) \quad (3)$$

$$= \text{\# of } DRCH \text{ channels}/4$$

where M is a multiplexing indicator and indicates the number of subzones using forward the DRCH (in units of 4 DRCH channels), and $N_{DRCH,TONE}$ denotes the number of tones used in one DRCH.

The number of slots that use global hopping in the reverse link that depends on the number of DRCHs, calculated from Equation (1), can be found using Equation (4).

$$N_{GLOBAL\_HOPPING} = \text{round}(N_{HARQ} \times N_{DRCH}/(N_{FFT} - N_{GUARD})) \quad (4)$$

In Equation (4), $N_{HARQ}$ denotes the number of interlaces using HARQ, $N_{FFT}$ denotes the number of tones caused by the use of Fast Fourier Transform (FFT), and $N_{GUARD}$ denotes the number of tones used as a guard. Therefore, Equation (4) means that all of the HARQ interlaces use a percentage of the channels used by the DRCH among all channels, for global hopping.

Assuming that all of the 32 channels are used in the 5-MHz band depending on the number of channels as an example of Equation (4), and 8 interlaces are provided, the multiplexing indicator M can be expressed as Equation (5), and it can be understood that the multiplexing indicator M is equal to that of Equation (3).

$$N_{GLOBAL\_HOPPING} = \text{round}(N_{HARQ} \times (N_{DRCH}/N_{DRCH,TONE})/((N_{FFT} - N_{GUARD})/N_{DRCH,TONE})) \quad (5)$$

$$= \text{round}(N_{HARQ} \times \text{\# of } DRCH \text{ channel}/(\text{\# of all channel}))$$

$$= \text{round}(8 \times \text{\# of } DRCH \text{ channel}/32)$$

$$= \text{\# of } DRCH \text{ channel}/4$$

Equation (6) is used as a method for calculating positions of slots allocated for reverse global hopping. Using the method of Equation (6), the positions of the slots using the global hopping scheme can be accurately designated.

$$\text{Floor}(k \times N_{HARQ}/N_{GLOBAL\_HOPPING}),$$
$$k=0,1,\ldots,N_{GLOBAL\_HOPPING}-1 \quad (6)$$

As a preferred embodiment of the present invention, it can be appreciated that when the multiplexing indicator=4, the system, if it has a total of 8 HARQ interlaces and uses Equation (6), uses the wide-band frequency hopping scheme in the even slots and the sub-band frequency hopping scheme in the odd slots.

As described above, depending on the multiplexing indicator provided by the present invention, the system can determine a percentage of resources used for the global hopping scheme in the reverse link from the information on the number of DRCHs in the forward link.

Equation (7) can be used as an equation for designating the positions of the slots using global hopping.

$$\text{roundup}(k \times N_{HARQ}/N_{GLOBAL\_HOPPING}),$$
$$k=0,1,\ldots,N_{GLOBAL\_HOPPING}-1 \quad (7)$$

With reference to FIGS. 6 to 9, a detailed description will be made of a transmission/reception apparatus and method for multiplexing DRCH and BRCH in a forward link according to the present invention.

Figure 6:
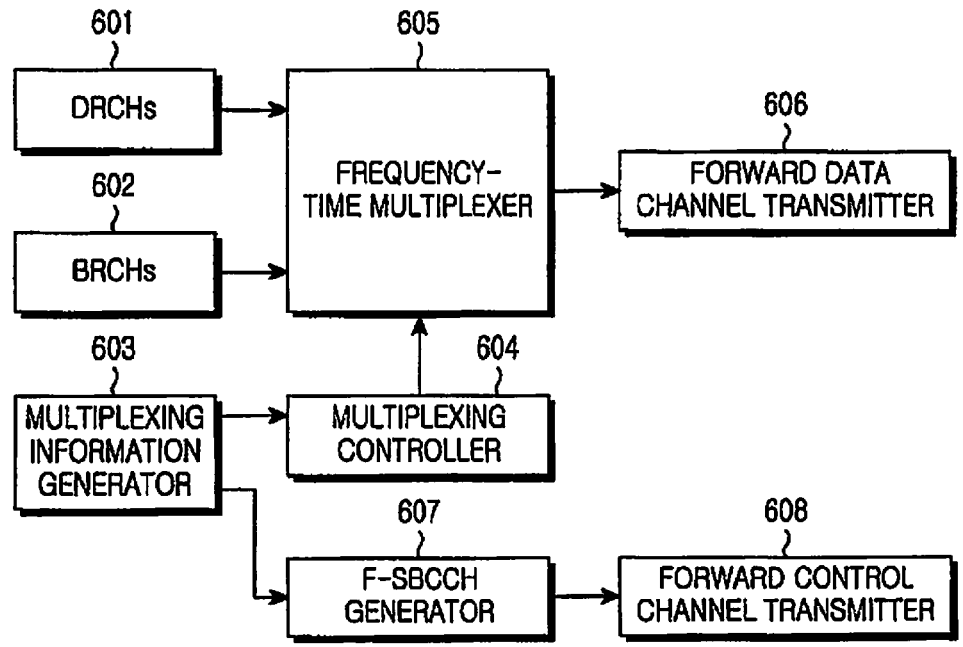
FIG. 6 is a diagram illustrating a transmission apparatus for multiplexing DRCH and BRCH in a forward link according to the present invention.

FIG. 6 is a diagram illustrating a transmission apparatus for multiplexing a DRCH and a BRCH in a forward link according to the present invention. Referring to FIG. 6, DRCHs 601 and BRCHs 602 are transferred to a frequency-time multiplexer 605. Information on the number of DRCHs allocated in one subzone and the number of subzones to which DRCH is allocated, is generated by means of a multiplexing information generator 603, and the generated information is transmitted over an F-SBCCH generated by an F-SBCCH generator 607 via a forward control channel transmitter 608. The information on the number of DRCHs allocated in one subzone and the number of subzones to which DRCH is allocated is also transferred to a multiplexing controller 604 where it is also used as the multiplexing information required for multiplexing the DRCH and the BRCH. The DRCHs and BRCHs multiplexed in the frequency-time multiplexer 605, depending on the multiplexing information, are transmitted via a forward data channel transmitter 606.

Figure 7:
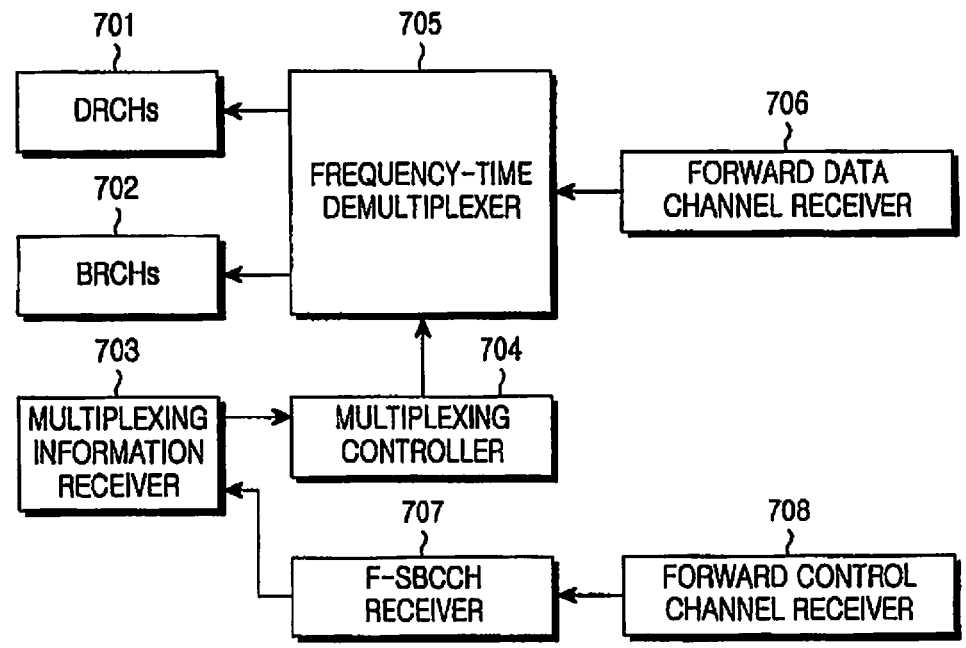
FIG. 7 is a diagram illustrating a reception apparatus for multiplexing DRCH and BRCH in a forward link according to the present invention.

FIG. 7 is a diagram illustrating a reception apparatus for multiplexing a DRCH and a BRCH in a forward link according to the present invention. Referring to FIG. 7, the data signal and control signal transmitted by the transmission apparatus of FIG. 6 are received via a forward data channel receiver 706 and a forward control channel receiver 708, respectively. The control channel received via the forward control channel receiver 708 is applied to a multiplexing information receiver 703 by way of an F-SBCCH receiver 707. The multiplexing information receiver 703 receives information on the number of DRCHs allocated in one subzone and the number of subzones to which the DRCH is allocated. The received information is applied to a multiplexing controller 704 where it is used for controlling a frequency-time demultiplexer 705. The data channel received via the forward data channel receiver 706 is separated into DRCHs and BRCHs in the frequency-time demultiplexer 705 under the control of the multiplexing controller 704.

Figure 8:
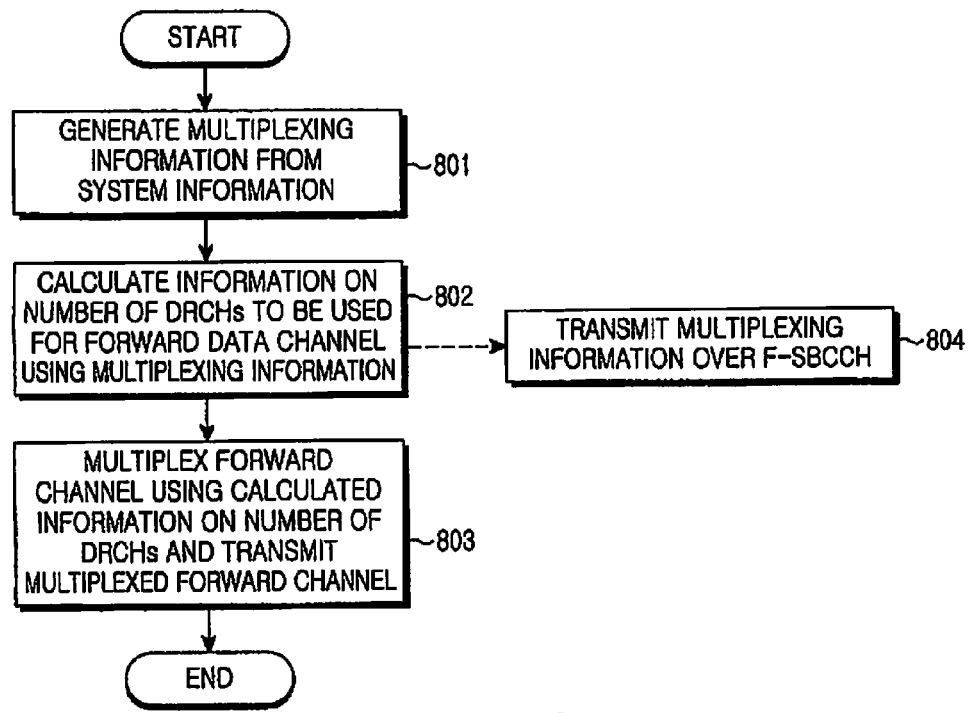
FIG. 8 is a flowchart illustrating a forward DRCH and Block Resource CHannel (BRCH) multiplexing method performed in the transmission apparatus of FIG. 6.

FIG. 8 is a flowchart illustrating a forward DRCH and BRCH multiplexing method performed in the transmission apparatus of FIG. 6. Referring to FIG. 8, in step 801, the multiplexing information generator 603 of FIG. 6 generates, from system information, information on the number of DRCHs allocated in one subzone and the number of subzones to which DRCH is allocated. In step 802, the multiplexing information generator 603 extracts information on the number of DRCHs to be used in a forward data channel from the generated multiplexing information. The extracted information on the number of DRCHs is applied to the multiplexing controller 604 of FIG. 6 where it is used for forward data channel multiplexing in step 803. The forward data channel multiplexing operation of step 803 is performed in the frequency-time multiplexer 605 of FIG. 6 under the control of the multiplexing controller 604. The multiplexed forward data channel is transmitted to a terminal by way of the forward data channel transmitter 606 of FIG. 6. The multiplexing information is transmitted in step 804 to the terminal over an F-SBCCH generated by the F-SBCCH generator 607 of FIG. 6 via the forward control channel transmitter 608 of FIG. 6.

Figure 9:
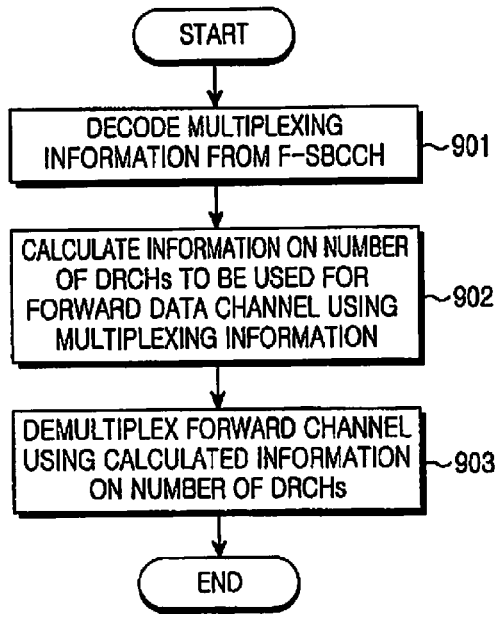
FIG. 9 is a flowchart illustrating a forward DRCH and BRCH multiplexing method performed in the reception apparatus of FIG. 7.

FIG. 9 is a flowchart illustrating a forward DRCH and BRCH multiplexing method performed in the reception apparatus of FIG. 7. Referring to FIG. 9, in step 901, the F-SBCCH receiver 707 of FIG. 7 decodes multiplexing information from an F-SBCCH channel. In step 902, the multiplexing information receiver 703 of FIG. 7 extracts information on the number of DRCHs used in the forward data channel from the decoded multiplexing information. The extracted information on the number of DRCHs is applied to the multiplexing controller 704 of FIG. 7 where it extracts the DRCHs and the BRCHs by demultiplexing in step 903 a forward data channel using the extracted information on the number of DRCHs. The extraction of the DRCHs and the BRCHs is performed by the frequency-time demultiplexer 705 of FIG. 7 under the control of the multiplexing controller 704.

With reference to FIGS. 10 to 13, a detailed description will now be given of a transmission/reception apparatus and method for multiplexing global hopping and local hopping in the reverse link.

Figure 10:
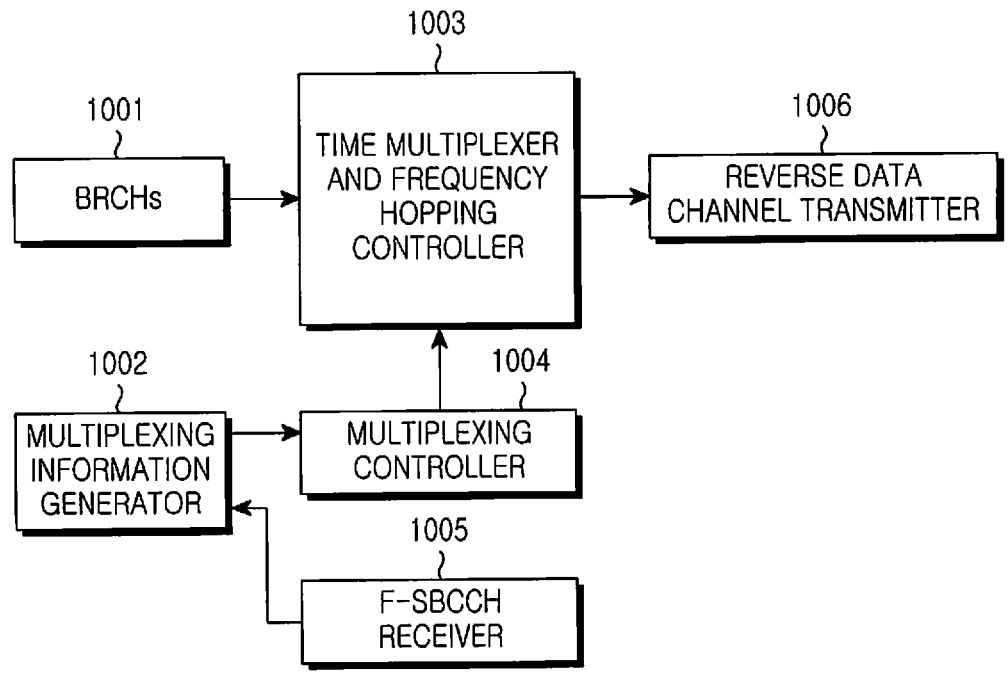
FIG. 10 is a diagram illustrating a transmission apparatus for multiplexing frequency hopping in a reverse link according to the present invention.

FIG. 10 is a diagram illustrating a transmission apparatus for multiplexing frequency hopping in a reverse link according to the present invention. Referring to FIG. 10, the reverse link has only BRCHs 1001, and uses different frequency hopping methods for each slot. The present invention uses both the global hopping and the local hopping method. The generated BRCHs 1001 are transferred to a time multiplexer and frequency hopping controller 1003. A multiplexing information generator 1002 extracts multiplexing information using information on the number of DRCHs allocated in one subzone and the number of subzones to which the DRCH is allocated, received from a base station by way of an F-SBCCH receiver 1005. The extracted multiplexing information is applied to a multiplexing controller 1004 where it is used for frequency hopping and time multiplexing for each slot in the time multiplexer and frequency hopping controller 1003 under the control of the multiplexing controller 1004. A reverse data channel transmitter 1006 transmits data in accordance with the time multiplexer and frequency hopping controller 1003.

Figure 11:
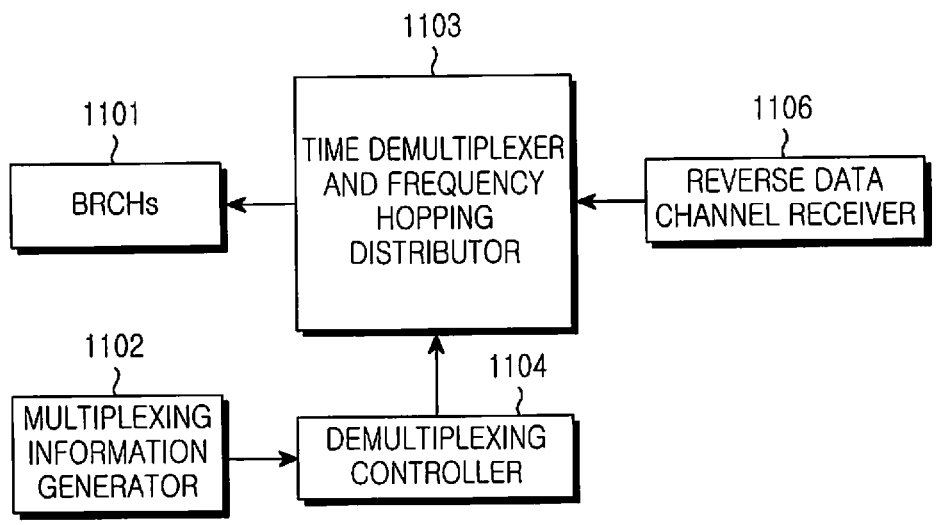
FIG. 11 is a diagram illustrating a reception apparatus for multiplexing frequency hopping in a reverse link according to the present invention.

FIG. 11 is a diagram illustrating a reception apparatus for multiplexing frequency hopping in a reverse link according to the present invention. Referring to FIG. 11, a reverse data channel receiver 1106 transfers a received data channel to a time demultiplexer and frequency hopping distributor 1103. A multiplexing information generator 1102 generates multiplexing information from the system information of a base station, and provides the generated multiplexing information to a demultiplexing controller 1104. The demultiplexing controller 1104 controls the time demultiplexer and frequency hopping distributor 1103 according to the multiplexing information so as to extract BRCH 1101 for each terminal from the received reverse data channel.

Figure 12:
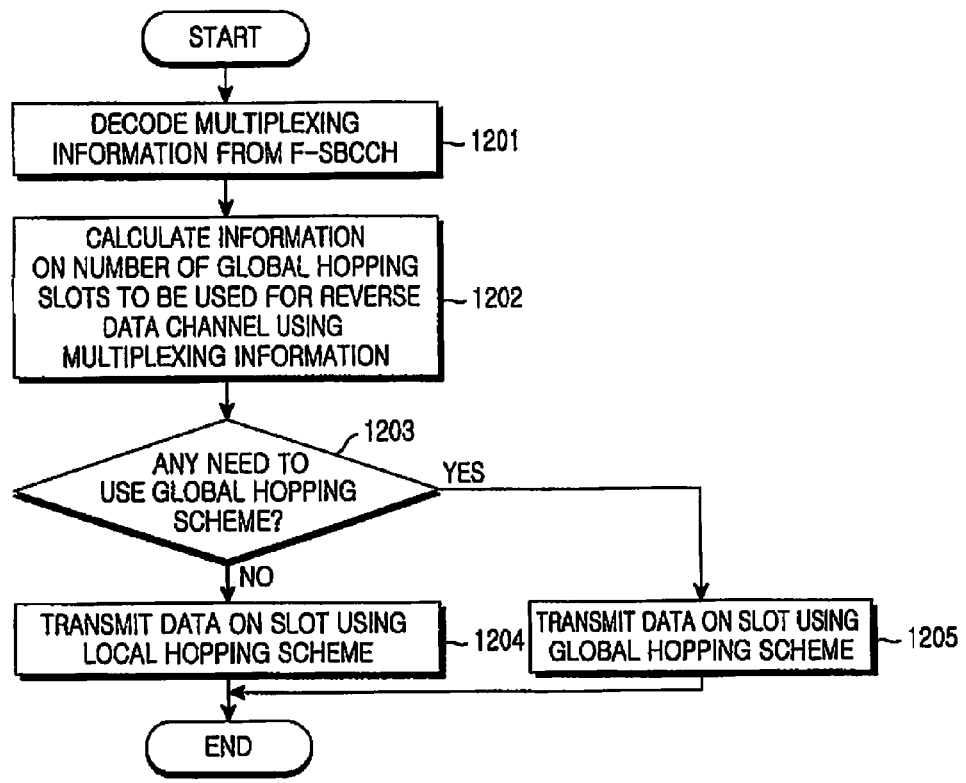
FIG. 12 is a flowchart illustrating a reverse frequency hopping multiplexing method performed in the transmission apparatus of FIG. 10.

FIG. 12 is a flowchart illustrating a reverse frequency hopping multiplexing method performed in the transmission apparatus of FIG. 10. Referring to FIG. 12, in step 1201, a terminal decodes information on the number of DRCHs allocated in one subzone and the number of subzones to which DRCH is allocated, from an F-SBCCH received from a base station, to thereby extract multiplexing information. In step 1202, the terminal extracts information on the number of slots for global hopping, to be used for a reverse data channel, from the extracted multiplexing information. The terminal determines in step 1203 whether it should use the global hopping scheme or the local hopping scheme. If the terminal determines to use the global hopping scheme, the terminal proceeds to step 1205 where it transmits data in the corresponding slot using the global hopping scheme. However, if the terminal determines to use the local hopping scheme, the terminal proceeds to step 1204 where it transmits data over the corresponding slot using the local hopping scheme.

Figure 13:
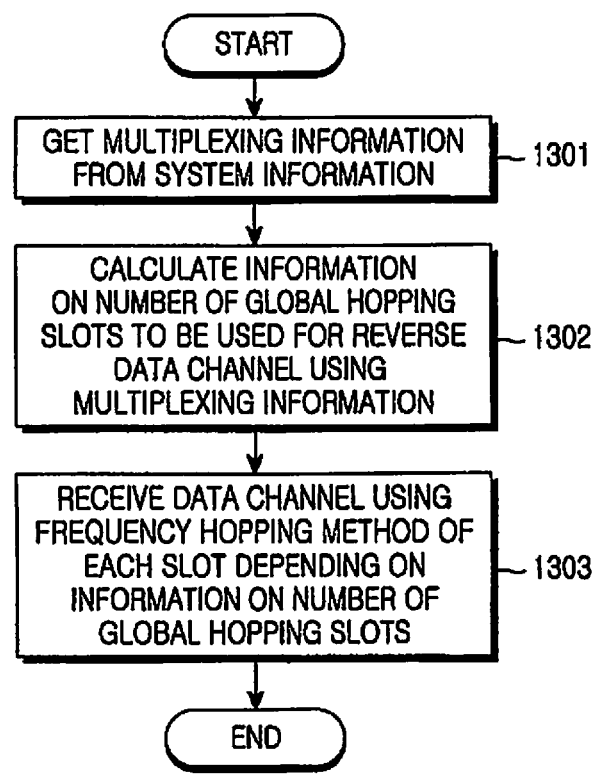
FIG. 13 is a flowchart illustrating a reverse frequency hopping multiplexing method performed in the reception apparatus of FIG. 11.

FIG. 13 is a flowchart illustrating a reverse frequency hopping multiplexing method performed in the reception apparatus of FIG. 11. Referring to FIG. 13, in step 1301, a base station obtains multiplexing information from system information. In step 1302, the base station extracts information on the number of slots for global hopping, used for a reverse data channel, from the multiplexing information. Based on the extracted information on the number of slots for global hopping, the base station extracts a data channel using a frequency hopping method (global hopping or local hopping method) for each slot in step 1303.

As is apparent from the foregoing description, the present invention can provide a frequency hopping multiplexing method and apparatus for efficiently indicating time division multiplexing for global hopping and local hopping, by indicating and using the number of slots and positions of slots for global hopping and local hopping to perform time division multiplexing on global hopping and local hopping scheme in the reverse link, depending on the information on the number of DRCHs, provided from the transmitting side over the F-SBCCH, one of the forward common channels, in the wireless communication system employing Frequency Division Multiple Access.

In addition, the present invention can efficiently control the wide-band and sub-band frequency hopping multiplexing in the reverse link without the unnecessary overhead, by using the existing control information provided over the forward link for reverse frequency hopping multiplexing. Furthermore, the present invention efficiently multiplexes reverse frequency hopping, thereby contributing to the maximization of the diversity effect.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting data in a mobile station of a wireless communication system, the method comprising:
   identifying hopping information including a number of sub-bands and a size of a sub-band;
   identifying resource allocation information;
   determining a resource index for transmitting the data based on the resource allocation information, a resource index change in a unit of a sub-band, a resource index change in a unit of a resource unit, the number of sub-bands, and the size of the sub-band; and
   transmitting the data to a base station using the determined resource index,
   wherein each sub-band includes at least one resource unit, and each resource unit includes a plurality of subcarriers.

2. The method of claim 1, wherein the resource index is determined based on a slot.

3. The method of claim 1, wherein the resource index change in the unit of the sub-band or the resource index change in the unit of the resource unit is performed in a hybrid automatic repeat request (HARQ) transmission interval.

4. The method of claim 1, wherein the resource index is determined by applying the resource index change in the unit of the sub-band or the resource index change in the unit of the resource unit.

5. The method of claim 1, wherein the hopping information indicates sub-bands used for data transmission.

6. A method for receiving data in a base station of a wireless communication system, the method comprising:
   identifying hopping information including a number of sub-bands and a size of a sub-band;
   identifying resource allocation information;
   determining a resource index used for receiving the data based on the resource allocation information, a resource index change in a unit of a sub-band, a resource index change in a unit of a resource unit, the number of sub-bands, and the size of the sub-band; and
   receiving the data from a mobile station using the determined resource index,
   wherein each sub-band includes at least one resource unit, and each resource unit includes a plurality of subcarriers.

7. The method of claim 6, wherein the resource index is determined based on a slot.

8. The method of claim 6, wherein the resource index change in the unit of the sub-band or the resource index change in the unit of the resource unit is performed in a hybrid automatic repeat request (HARQ) transmission interval.

9. The method of claim 6, wherein the resource index is determined by applying the resource index change in the unit of the sub-band or the resource index change in the unit of the resource unit.

10. The method of claim 6, wherein the hopping information indicates sub-bands used for data reception.

11. An apparatus for transmitting data in a mobile station of a wireless communication system, the apparatus comprising:
    a controller configured to: identify hopping information including a number of sub-bands and a size of a sub-band, identify resource allocation information, and determine a resource index for transmitting the data based on the resource allocation information, a resource index change in a unit of a sub-band, a resource index change in a unit of a resource unit, the number of sub-bands, and the size of the sub-band; and
    a transmitter configured to transmit the data to a base station using the resource index,
    wherein each sub-band includes at least one resource unit, and each resource unit includes a plurality of subcarriers.

12. The apparatus of claim 11, wherein the resource index is determined based on a slot.

13. The apparatus of claim 11, wherein the resource index change in the unit of the sub-band or the resource index change in the unit of the resource unit is performed in a hybrid automatic repeat request (HARQ) transmission interval.

14. The apparatus of claim 11, wherein the resource index is determined by applying the resource index change in the unit of the sub-band or the resource index change in the unit of the resource unit.

15. The apparatus of claim 11, wherein the hopping information indicates sub-bands used for data transmission.

16. An apparatus for receiving data in a base station of a wireless communication system, the apparatus comprising:
    a controller configured to identify hopping information including a number of sub-bands and a size of a sub-band, identify resource allocation information, determine a resource index used for receiving the data based on the resource allocation information, a resource index change in a unit of a sub-band, a resource index change in a unit of a resource unit, the number of sub-bands, and the size of the sub-band; and
    a receiver configured to receive the data from a mobile station using the resource index, wherein each sub-band includes at least one resource unit, and each resource unit includes a plurality of subcarriers.

17. The apparatus of claim 16, wherein the resource index is determined based on a slot.

18. The apparatus of claim 16, wherein the resource index change in the unit of the sub-band or the resource index change in the unit of the resource unit is performed in a hybrid automatic repeat request (HARQ) transmission interval.

19. The apparatus of claim 16, wherein the resource index is determined by applying the resource index change in the unit of the sub-band or the resource index change in the unit of the resource unit.

20. The apparatus of claim 16, wherein the hopping information indicates sub-bands used for data reception.

* * * * *